(12) United States Patent
Joranlien (10) Patent No.: US 7,032,927 B1
(45) Date of Patent: Apr. 25, 2006

(54) ROLLBAR APPARATUS FOR AUTOMOBILES

(76) Inventor: Ric S. Joranlien, 2145 20th Ave., Monroe, WI (US) 53566

( * ) Notice: Subject to any disclaimer, the term of this patent is extended or adjusted under 35 U.S.C. 154(b) by 245 days.

(21) Appl. No.: 10/667,539

(22) Filed: Sep. 22, 2003

Related U.S. Application Data (60) Provisional application No. 60/414,720, filed on Sep. 30, 2002.

(51) Int. Cl.
*B60R 21/13* (2006.01)

(52) U.S. Cl. .................................. 280/756; 296/190.03

(58) Field of Classification Search ................ 280/756; 296/190.03, 102; 180/311
See application file for complete search history.

(56) References Cited

U.S. PATENT DOCUMENTS

| | | | |
|---|---|---|---|
| RE28,876 E | * | 6/1976 | Notestine et al. ........... 280/756 |
| 4,900,058 A | * | 2/1990 | Hobrecht ................... 280/756 |
| 5,622,382 A | * | 4/1997 | Zepnik et al. ............... 280/756 |
| 5,641,193 A | * | 6/1997 | Zepnik et al. .......... 296/107.09 |
| 6,217,104 B1 | * | 4/2001 | Neubrand .................... 296/108 |
| 6,443,517 B1 | * | 9/2002 | Just et al. .............. 296/107.09 |

FOREIGN PATENT DOCUMENTS

JP    11115662 A  *  4/1999

OTHER PUBLICATIONS

Alumex roolbar information sheets (Germany), internet content, Aug. 21, 2003, ten (10) pages.

* cited by examiner

*Primary Examiner*—David R. Dunn (57) ABSTRACT

A rollbar apparatus for a vehicle body is disclosed, for protecting occupants of the vehicle body. The rollbar apparatus includes a first hoop with an inner leg and an outer leg, and a second hoop spaced relative to the first hoop and also including an inner leg and an outer leg. The inner legs of the first and second hoop are disposed adjacent to each other and supported adjacent to the vehicle body. A joining member extends between said inner legs, so that in the event of an accident, the hoops of the rollbar apparatus assist in protecting the occupants of the vehicle from injury.

14 Claims, 5 Drawing Sheets

ROLLBAR APPARATUS FOR AUTOMOBILES

CROSS REFERENCE TO RELATED APPLICATIONS

This application claims the benefit of Provisional Patent Application Ser. No. 60/414,720, filed Sep. 30, 2002 by the present inventor. All subject matter of the provisional application is incorporated herein by reference.

BACKGROUND OF THE INVENTION

1. Field of the Invention

The present invention relates to a rollbar apparatus for protecting occupants of a vehicle. More specifically, the present invention relates to a double hoop rollbar for use in passenger cars and trucks.

2. Background Information

In cars and trucks, rollbars are often provided for both roll-over protection and for aesthetic purposes. Rollbars are particularly popular in convertible type cars and roadsters, because of the lack of a rigid roof structure. Aesthetic "style" bars are often installed just for looks, and generally include a chrome or other bright finish to make them visually attractive. Other rollbars are provided for protection against injury in the case of a rollover, especially in sports or racing cars which are driven aggressively.

These functional rollbars extend slightly above the heads of the occupants, to protect them in the event of a vehicle rollover. There are two basic types of rollbars. The first type is a single hoop style. The second type is a double hoop style. The single hoop rollbar has one main hoop which spans from one side of the vehicle to the other side. The double hoop rollbar generally utilizes a smaller hoop behind each of the front seats. Both styles often have brace bars or structural members to support their shape. In addition, rollbars can be bolted or welded into position. Also, additional structural bars can be added to the basic rollbar to form a roll cage, which can more thoroughly protect the occupants of the vehicle.

For double hoop style rollbars, the hoops each have an inner leg which needs to be supported in the center of the car. For rollbars which do not provide protection to the occupants, this support is usually a single bent tube attached only to the sides of the vehicle. For double hoop rollbars with the stated intent of occupant protection, these inner legs must be supported in a more substantial manner.

Some vehicles, especially smaller vehicles, do not have adequate structure or access to support the inner legs in the center of the vehicle. In addition, the tight clearances between the seats and the body of the vehicle severely limit the mounting of traditional double hoop rollbar structures. As a result, rollbars intended for protection of the occupants in certain vehicles have been limited to single hoop type structures.

In prior art single hoop rollbars, the top bar of the hoop is often in line with the rearview mirror, partially obscuring rearview vision. There are often brace bars that attach to the center of the single hoop, further interfering with rearview vision. These brace bars are required on a single hoop rollbar to reinforce the center section of the hoop.

Also, it is a common practice in small roadsters to be able to raise the convertible top while sitting in the driver seat. In the prior art single hoop rollbars, this is not possible.

In the prior art double hoop rollbars, some vehicle manufacturers have provided factory installed structural hoop shapes that attach to the seat backs. However, this requires a much more rigid seat structure and thus additional cost. In addition, if alternate seats such as racing seats are installed, the rollbars are also removed, and must be replaced. The hoops which install in the seat backs are also limited in size to the width of the seat, and cannot be easily customized.

Some vehicle manufacturers have chosen not to provide rollover protection for their vehicles. In these cases, there is no provision for the center support required for a structurally sound rollbar, thus an alternative method must be developed for those owners wishing to have rollover protection with the visual appeal of a double hoop rollbar.

The present invention overcomes the problem of inadequate center support by providing a method of support for the inner legs of the double hoop rollbar. The present invention provides a joining member between the inner rollbar legs and a method of attaching the inner rollbar legs to other structural points of the vehicle. The joining member can be made of square or round tubing, flat bar, or any other structural shape. In order to facilitate ease of installation and shipping, the joining member can be comprised of several different parts, which are fastened together during final assembly of the apparatus. This joining member assembly can include flat plates or angles bolted together, or tubing with telescoping sleeves which are fastened together.

The joining member and inner rollbar legs will sometimes utilize one or more support legs, which contact the body of the vehicle. The support legs can be made of any structural component, including flat steel plate, angles, tubes, or even synthetic materials such as plastic or nylon. Some support legs will be relatively long, or could be simple spacer blocks or washers. In some applications, the joining member, inner rollbar legs, or support legs could be held in place using existing vehicle body structure, without the use of additional fasteners.

It is desirable to have an improved design for a rollbar apparatus which allows the double hoop style structure to be used, while maintaining the rigidity and center support required for rollover protection.

Thus, one of the objectives of the present invention is to provide a double hoop rollbar apparatus which overcomes the problems associated with prior art devices and makes a considerable contribution to the art of rollbar design. Depending on the embodiment of the present invention, the advantages include, for example:

(a) providing a rollbar which is intended to protect the occupants of a vehicles which do not have adequate mounting structure near the center of the vehicle;

(b) providing a rollbar which is an alternative to factory mounted rollbars, without forfeiting a level of rollover protection;

(c) providing a rollbar which is intended to help protect the occupants of a vehicle, without obstructing the view through the rearview mirror;

(d) providing a rollbar which is intended to help protect the occupants of a vehicle without limiting the ability to raise and lower the convertible top from the driver's seat;

(e) providing a joining member between the inside legs of the double hoops, to provide lateral strength to the structure;

(f) providing a rollbar which consists of several parts fastened together, so that easy shipping, installation, and removal of the structure is possible;

Therefore, it is a primary feature of the present invention to provide a rollbar apparatus which overcomes the aforementioned problems associated with the prior art rollbars and which provides a significant contribution to the art of automotive rollover protection.

Other features and advantages of the rollbar apparatus according to the present invention will be readily apparent to those skilled in the art by a consideration of the detailed description contained herein of a preferred embodiment of the present invention.

SUMMARY OF THE INVENTION

A rollbar apparatus for a vehicle body for protecting occupants of the vehicle body, including a first hoop with an inner leg and an outer leg, a second hoop spaced relative to the first hoop and also including an inner leg and an outer leg, with the inner legs disposed adjacent to each other. The inner legs are supported adjacent to the vehicle body, and a joining member extends between said inner legs, so that in the event of an accident, the hoops of the rollbar apparatus assist in protecting the occupants of the vehicle from injury.

BRIEF DESCRIPTION OF THE DRAWINGS

Note that similar reference numbers refer to similar parts throughout the various embodiments of the rollbar apparatus shown in the drawings.

DETAILED DESCRIPTION OF THE DRAWINGS

Figure 1:
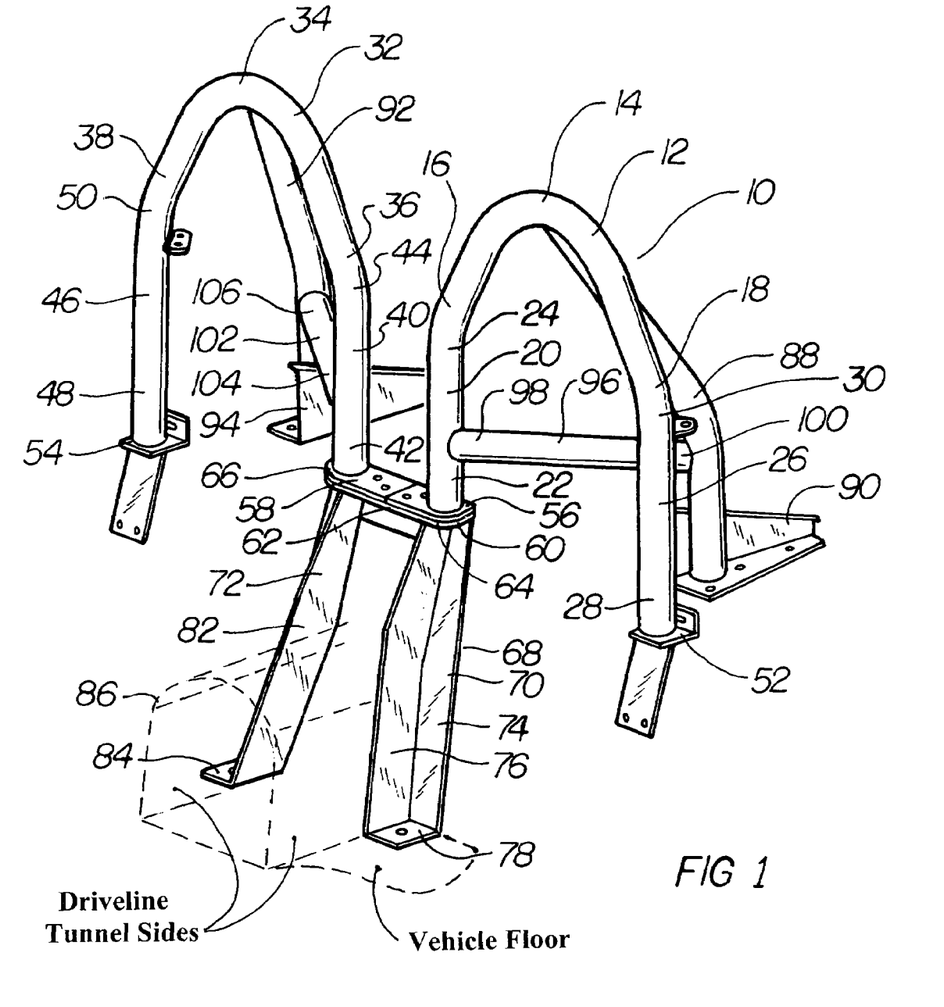
FIG. 1 is a perspective view of a preferred rollbar apparatus.

FIG. 1 is a perspective view of a rollbar apparatus generally designated 10 according to the present invention. The apparatus 10 has a hoop 12 which includes a top portion 14, an inner leg 20, and an outer leg 26. The top portion 14 includes a first endpoint 16 and a second endpoint 18. The inner leg 20 includes a first extremity 22 and a second extremity 24. The outer leg 26 includes a first zone 28 and a second zone 30. The apparatus 10 also has a further hoop 32 which includes a further top portion 34, a further inner leg 40, and a further outer leg 46. The further top portion 34 includes a further first endpoint 36 and a further second endpoint 38. The further inner leg 40 includes a further first extremity 42 and a further second extremity 44. The further outer leg 46 includes a further first zone 48 and a further second zone 50. The outer leg 26 is terminated at an outer leg foot 52, and the further outer leg 46 is terminated at a further outer leg foot 54. The outer leg foot 52 and the further outer leg foot 54 are normally attached to the vehicle body (not shown). The inner leg 20 is terminated at an upper joining member 56, and the further inner leg 40 is terminated at a further upper joining member 58. The upper joining member 56 and the further upper joining member 58 are removably attached to a lower joining member 60. The assembly of the upper joining member 56, the further upper joining member 58, and the lower joining member 60 comprise a joining member 62. The joining member 62 has a first end 64 and a second end 66.

A saddle 68 is comprised of the lower joining member 60, a support leg 70, and a further support leg 72. The support leg 70 is comprised of a saddle back 74, a saddle side 76, and a saddle foot 78. The further support leg 72 is comprised of a saddle back 74, a further saddle side 82, and a further saddle foot 84. The saddle is intended to be straddled over a driveshaft tunnel 86 which is a component of the vehicle. The support leg 70 and the further support leg 72 contacting the vehicle body. The saddle side 76 and the further saddle side 82 can be located immediately adjacent to the sides of the driveshaft tunnel, to help give support to the rollbar apparatus.

The top portion 14 of the hoop 12 is connected to a hoop brace 88 which terminates at a hoop brace foot 90. The further top portion 34 of the further hoop 32 is connected to a further hoop brace 92 which terminates at a further hoop brace foot 94. The hoop brace foot 90 and the further hoop brace foot 94 are normally attached to the vehicle body (not shown).

An inner leg brace 96 has a first edge 98 and a second edge 100. The first edge 98 of the inner leg brace 96 is attached to the first extremity 22 of the inner leg 20, and the second edge 100 of the inner leg brace 96 is attached to the hoop brace 88. A further inner leg brace 102 has a further first edge 104 and a further second edge 106. The further first edge 104 of the further inner leg brace 102 is attached to the further first extremity 42 of the further inner leg 40, and the further second edge 106 of the further inner leg brace 102 is attached to the further hoop brace 92.

The rollbar apparatus 10 is attached to the vehicle (not shown) by means of a plurality of mounting holes and fasteners.

Figure 2:
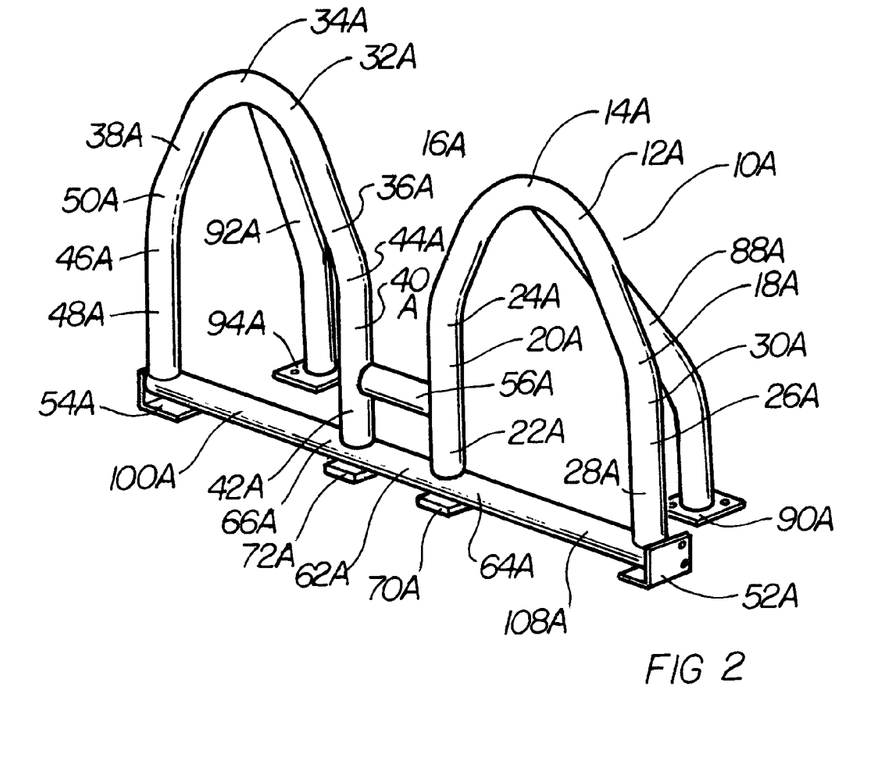
FIG. 2 is a perspective view of an alternative configuration of a rollbar apparatus.

FIG. 2 is a perspective view of an alternative configuration of a rollbar apparatus generally designated 10a according to the present invention. The apparatus 10a has a hoop 12a which includes a top portion 14a, an inner leg 20a, and an outer leg 26a. The top portion 14a includes a first endpoint 16a and a second endpoint 18a. The inner leg 20a includes a first extremity 22a and a second extremity 24a. The outer leg 26a includes a first zone 28a and a second zone 30a. The apparatus 10a also has a further hoop 32a which includes a further top portion 34a, a further inner leg 40a, and a further outer leg 46a. The further top portion 34a includes a further first endpoint 36a and a further second endpoint 38a. The further inner leg 40a includes a further first extremity 42a and a further second extremity 44a. The further outer leg 46a includes a further first zone 48a and a further second zone 50a. The outer leg 26a is terminated at an outer leg foot 52a and a support leg brace 108a, and the further outer leg 46a is terminated at a further outer leg foot 54a and a further support leg brace 110a. The outer leg foot 52a and the further outer leg foot 54a are normally attached to the vehicle body (not shown).

A joining member 62a consists of a first end 64a and a second end 66a. The first extremity 22a of the inner leg 20a is attached to the first end 64a of the joining member 62a. The further first extremity 42a of the further inner leg 40a is attached to the second end 66a of the joining member 62a. An upper joining member 56a is positioned and attached to the inner leg 20a and to the further inner leg 40a. A support leg 70a is attached adjacent to the first extremity 22a of the inner leg 20a, the first end 64a of joining member 62a, and the support leg brace 108a. The further support leg 72a is attached adjacent to the further first extremity 42a of the further inner leg 40a, the second end 66a of joining member 62a, and the further support leg brace 110a. The support leg 70a and the further support leg 72a contacting the vehicle body.

The top portion 14a of the hoop 12a is connected to a hoop brace 88a which terminates at a hoop brace foot 90a. The further top portion 34a of the further hoop 32a is connected to a further hoop brace 92a which terminates at a further hoop brace foot 94a. The hoop brace foot 90a and the further hoop brace foot 94a are normally attached to the vehicle body (not shown).

The rollbar apparatus 10a is attached to the vehicle (not shown) by means of a plurality of mounting holes and fasteners.

Figure 3:
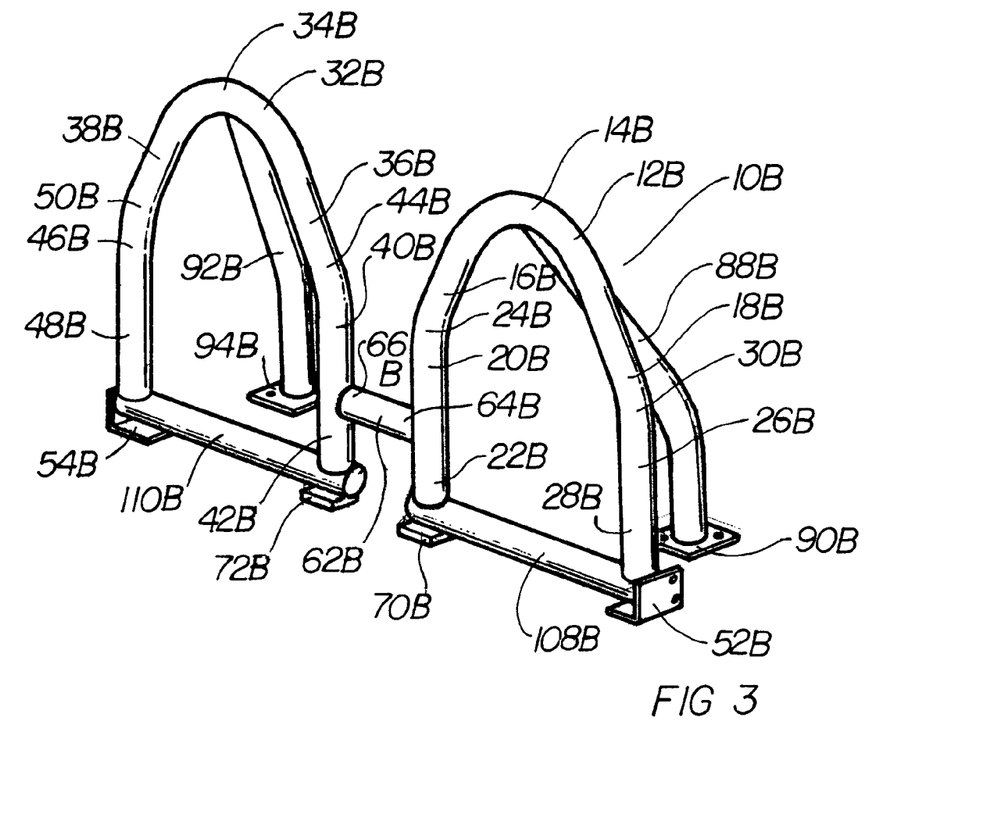
FIG. 3 is a perspective view of an alternative configuration of a rollbar apparatus.

FIG. 3 is a perspective view of an alternative configuration of a rollbar apparatus generally designated 10b according to the present invention. The apparatus 10b has a hoop 12b which includes a top portion 14b, an inner leg 20b, and an outer leg 26b. The top portion 14b includes a first endpoint 16b and a second endpoint 18b. The inner leg 20b includes a first extremity 22b and a second extremity 24b. The outer leg 26b includes a first zone 28b and a second zone 30b. The apparatus 10b also has a further hoop 32b which includes a further top portion 34b, a further inner leg 40b, and a further outer leg 46b. The further top portion 34b includes a further first endpoint 36b and a further second endpoint 38b. The further inner leg 40b includes a further first extremity 42b and a further second extremity 44b. The further outer leg 46b includes a further first zone 48b and a further second zone 50b. The outer leg 26b is terminated at an outer leg foot 52b and a support leg brace 108b, and the further outer leg 46b is terminated at a further outer leg foot 54b and a further support leg brace 110b. The outer leg foot 52b and the further outer leg foot 54b are normally attached to the vehicle body (not shown).

A joining member 62b consists of a first end 64b and a second end 66b. The first extremity 22b of the inner leg 20b is attached to the first end 64b of the joining member 62b. The further first extremity 42b of the further inner leg 40b is attached to the second end 66b of the joining member 62b. A support leg 70b is attached adjacent to the first extremity 22b of the inner leg 20b, and the support leg brace 108b. The further support leg 72b is attached adjacent to the further first extremity 42b of the further inner leg 40b, and the further support leg brace 110b. The support leg 70b and the further support leg 72b contacting the vehicle body.

The top portion 14b of the hoop 12b is connected to a hoop brace 88b which terminates at a hoop brace foot 90b. The further top portion 34b of the further hoop 32b is connected to a further hoop brace 92b which terminates at a further hoop brace foot 94b. The hoop brace foot 90b and the further hoop brace foot 94b are normally attached to the vehicle body (not shown).

The rollbar apparatus 10b is attached to the vehicle (not shown) by means of a plurality of mounting holes and fasteners.

Figure 4:
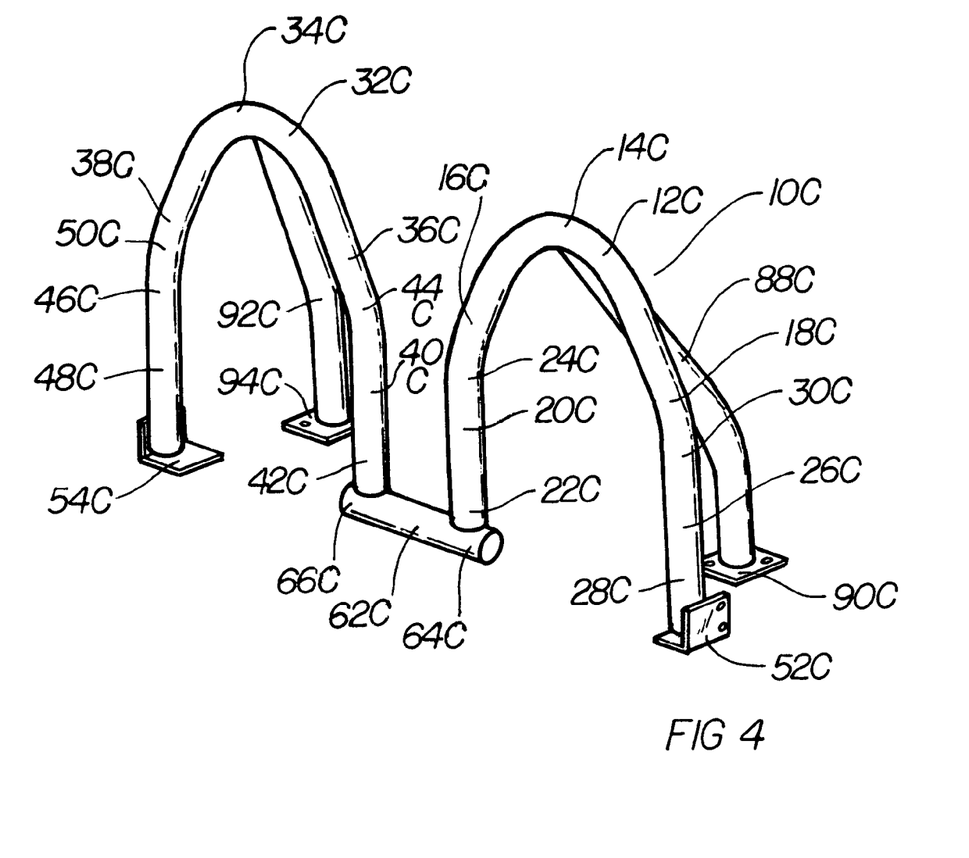
FIG. 4 is a perspective view of an alternative configuration of a rollbar apparatus.

FIG. 4 is a perspective view of an alternative configuration of a rollbar apparatus generally designated 10c according to the present invention. The apparatus 10c has a hoop 12c which includes a top portion 14c, an inner leg 20c, and an outer leg 26c. The top portion 14c includes a first endpoint 16c and a second endpoint 18c. The inner leg 20c includes a first extremity 22c and a second extremity 24c. The outer leg 26c includes a first zone 28c and a second zone 30c. The apparatus 10c also has a further hoop 32c which includes a further top portion 34c, a further inner leg 40c, and a further outer leg 46c. The further top portion 34c includes a further first endpoint 36c and a further second endpoint 38c. The further inner leg 40c includes a further first extremity 42c and a further second extremity 44c. The further outer leg 46c includes a further first zone 48c and a further second zone 50c. The outer leg 26c is terminated at an outer leg foot 52c, and the further outer leg 46c is terminated at a further outer leg foot 54c. The outer leg foot 52c and the further outer leg foot 54c are normally attached to the vehicle body (not shown).

A joining member 62c consists of a first end 64c and a second end 66c. The first extremity 22c of the inner leg 20c is attached to the first end 64c of the joining member 62c. The further first extremity 42c of the further inner leg 40c is attached to the second end 66c of the joining member 62c.

The top portion 14c of the hoop 12c is connected to a hoop brace 88c which terminates at a hoop brace foot 90c. The further top portion 34c of the further hoop 32c is connected to a further hoop brace 92c which terminates at a further hoop brace foot 94c. The hoop brace foot 90c and the further hoop brace foot 94c are normally attached to the vehicle body (not shown).

The rollbar apparatus 10c is attached to the vehicle (not shown) by means of a plurality of mounting holes and fasteners.

Figure 5:
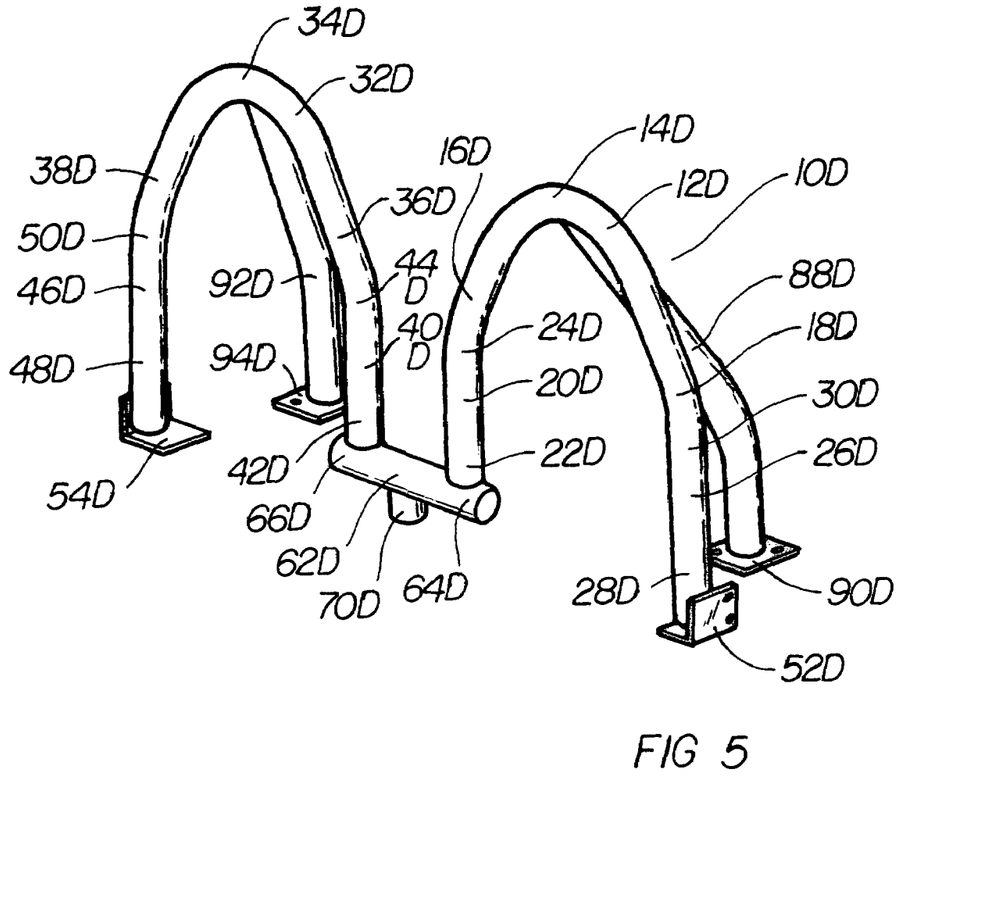
FIG. 5 is a perspective view of an alternative configuration of a rollbar apparatus.

FIG. 5 is a perspective view of an alternative configuration of a rollbar apparatus generally designated 10d according to the present invention. The apparatus 10d has a hoop 12d which includes a top portion 14d, an inner leg 20d, and an outer leg 26d. The top portion 14d includes a first endpoint 16d and a second endpoint 18d. The inner leg 20d includes a first extremity 22d and a second extremity 24d. The outer leg 26d includes a first zone 28d and a second zone 30d. The apparatus 10d also has a further hoop 32d which includes a further top portion 34d, a further inner leg 40d, and a further outer leg 46d. The further top portion 34d includes a further first endpoint 36d and a further second endpoint 38d. The further inner leg 40d includes a further first extremity 42d and a further second extremity 44d. The further outer leg 46d includes a further first zone 48d and a further second zone 50d. The outer leg 26d is terminated at an outer leg foot 52d, and the further outer leg 46d is terminated at a further outer leg foot 54d. The outer leg foot 52d and the further outer leg foot 54d are normally attached to the vehicle body (not shown).

A joining member 62d consists of a first end 64d and a second end 66d. The first extremity 22d of the inner leg 20d is attached to the first end 64d of the joining member 62d. The further first extremity 42d of the further inner leg 40d is attached to the second end 66d of the joining member 62d. A support leg 70d is attached adjacent to the joining member 62d, and the support leg 70d contacts the vehicle body.

The top portion 14d of the hoop 12d is connected to a hoop brace 88d which terminates at a hoop brace foot 90d. The further top portion 34d of the further hoop 32d is connected to a further hoop brace 92d which terminates at a further hoop brace foot 94d. The hoop brace foot 90d and the further hoop brace foot 94d are normally attached to the vehicle body (not shown).

The rollbar apparatus 10d is attached to the vehicle (not shown) by means of a plurality of mounting holes and fasteners.

OPERATION

In operation of the rollbar apparatus 10, the rollbar hoop 12 and further hoop 32 are bolted securely to the structure of the vehicle body to create a rigid structure designed to help protect the vehicle occupants in case of a rollover. After locating the rollbar apparatus 10 in proper position inside the vehicle body, holes are drilled through the body to correspond with the mounting holes in the rollbar apparatus 10.

Mounting holes are typically located in the outer leg foot 52 and further outer leg foot 54, saddle foot 78 and further saddle foot 84, and the hoop brace foot 90 and further hoop brace foot 94. Fasteners (not shown) are then installed through the drilled holes to affix the rollbar apparatus 10 to the vehicle body. Steel washers or backer plates (not shown) are sometimes installed on the underside of the vehicle body to further support the rollbar apparatus 10.

I claim:

1. A rollbar apparatus for a vehicle body for protecting occupants of the vehicle body, said rollbar apparatus comprising:
   a hoop;
   said hoop including:
      an inner leg having a first and second extremity;
      an outer leg having a first and second zone, said outer leg being spaced relative to said inner leg;
   a further hoop spaced relative to said hoop;
   said further hoop including:
      a further inner leg disposed adjacent to said inner leg of said hoop, said further inner leg having a further first and further second extremity;
      a further outer leg spaced relative to said further inner leg said further outer leg having a further first and further second zone;
   said first extremity of said inner leg and said further first extremity of said further inner leg being supported adjacent to the vehicle body; and
   a joining member having a first and second end, said joining member extending between said inner leg and said further inner leg,
   said hoop further includes:
      a top portion;
      said top portion being disposed between said second extremity of said inner leg and said second zone of said outer leg;
      a hoop brace secured to said top portion of said hoop and extending between said top portion and the vehicle body;
   said further hoop further includes:
      a further top portion disposed between said further second extremity of said further inner leg and said further second zone of said further outer leg;
      a further hoop brace secured to said further top portion of said further hoop and extending between said further top portion and the vehicle body,
   an inner leg brace having a first and a second edge;
      said first edge of inner leg brace connected to said inner leg, and said second edge of inner leg brace connected to said hoop brace;
      a further inner leg brace having a further first and further second edge;
      said further first edge connected to said further inner leg, and said further second edge connected to said further hoop brace;
      so that in the event of an accident said inner leg brace and said further inner leg brace of said rollbar apparatus assists in protecting the occupants of the vehicle from injury.

2. The rollbar apparatus of claim 1 wherein; said joining member is supported by the vehicle body.

3. The rollbar apparatus of claim 2 wherein; said joining member is removably attached to the vehicle body such that attachment of said roll bar apparatus is permitted.

4. The rollbar apparatus of claim 1 wherein said joining member includes:
   an upper joining member;
   a lower joining member disposed below said upper joining member.

5. The rollbar apparatus of claim 4 wherein;
   said upper and said lower joining members are removably attached to each other.

6. The rollbar apparatus of claim 1 further including:
   a support leg attached to said joining member;
   said support leg being disposed adjacent to said first extremity of said inner leg and said further first extremity of said further inner leg.

7. The rollbar apparatus as set forth in claim 6 where said support leg is contacting the vehicle body.

8. The rollbar apparatus as set forth in claim 7 where said support leg is removably attached to the vehicle body.

9. The rollbar apparatus as set forth in claim 7 where said support leg is removably attached to the floor of the vehicle body.

10. The rollbar apparatus of claim 1 wherein said joining member further includes: a saddle attached to said joining member, said saddle comprising;
    a support leg located adjacent to a driveshaft tunnel of said vehicle;
    a further support leg located on the opposite side of said driveshaft tunnel;
    and said saddle contacting the vehicle body.

11. The rollbar apparatus of claim 10 wherein;
    said saddle is removably attached to the vehicle body such that attachment of said roll bar apparatus is permitted.

12. The rollbar apparatus of claim 10 wherein;
    said saddle is removably attached to the floor of the vehicle body such that attachment of said roll bar apparatus is permitted.

13. The rollbar apparatus of claim 10 wherein;
    said saddle is removably attached to said joining member such that attachment of said saddle is permitted.

14. A rollbar apparatus for a vehicle body for protecting occupants of the vehicle body, said rollbar apparatus comprising:
    a hoop;
    said hoop including:
       an inner leg having a first and second extremity;
       an outer leg having a first and second zone, said outer leg being spaced relative to said inner leg;
    a top portion disposed between said second extremity of said inner leg and said second zone of said outer leg;
    a hoop brace secured to said top portion of said hoop and extending between said top portion and the vehicle body;
    an inner leg brace having a first and a second edge;
    said first edge of said inner leg brace connected to said inner leg, and said second edge of said inner leg brace connected to said hoop brace;
    a further hoop spaced relative to said hoop;
    said further hoop including:
       a further inner leg having a further first and further second extremity;
       a further outer leg having a further first and further second zone;
    said further outer leg being spaced relative to said further inner leg;
    a further top portion disposed between said further second extremity of said further inner leg and said further second zone of said further outer leg;
    said first extremity of said inner leg and said further first extremity of said further inner leg being supported adjacent to the vehicle body;

a further hoop brace secured to said further top portion of said further hoop and extending between said further top portion and the vehicle body;
a further inner leg brace having a further first edge and further second edge; and
said further first edge of said further inner leg brace connected to said further inner leg, and said further second edge of said further inner leg brace being connected to said further hoop brace, so that in the event of an accident, said hoops, said hoop braces, and said inner leg braces of said rollbar apparatus assist in protecting the occupants of the vehicle from injury.

* * * * *